United States Patent
Hamdi et al.

(10) Patent No.: US 9,798,633 B2
(45) Date of Patent: Oct. 24, 2017

(54) ACCESS POINT CONTROLLER FAILOVER SYSTEM

(71) Applicant: Dell Products L.P., Round Rock, TX (US)

(72) Inventors: Rabah S. Hamdi, Spring, TX (US); Christopher Stephen Petrick, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 207 days.

(21) Appl. No.: 14/557,523

(22) Filed: Dec. 2, 2014

(65) Prior Publication Data
US 2016/0154715 A1 Jun. 2, 2016

(51) Int. Cl.
G06F 11/00 (2006.01)
G06F 11/20 (2006.01)
H04L 29/14 (2006.01)

(52) U.S. Cl.
CPC .......... *G06F 11/2005* (2013.01); *H04L 69/40* (2013.01); *G06F 2201/85* (2013.01)

(58) Field of Classification Search
CPC .. G06F 11/2005; G06F 2201/85; H04L 69/40; H04L 67/142
USPC ....................................................... 714/4.11
See application file for complete search history.

(56) References Cited

U.S. PATENT DOCUMENTS 8,027,248 B2 9/2011 Balasubramanian et al.
2007/0249291 A1* 10/2007 Nanda ............... H04W 36/0083
455/73
2014/0204727 A1* 7/2014 Gu ......................... H04W 12/04
370/217
2016/0154722 A1* 6/2016 Petrick .................. G06F 11/327
714/57
2016/0295477 A1* 10/2016 Zhu ....................... H04W 36/14

FOREIGN PATENT DOCUMENTS

WO WO 2014009250 A1 1/2014

OTHER PUBLICATIONS

"Cisco Small Business Wireless Access Points"; http://www.cisco.com/c/dam/en/us/products/collateral/wireless/wap321-wireless-n-selectable-band-access-point-single-point-setup/aag_c45-717569.pdf.
"Ensuring Nonstop System-Level Reliability for Wireless LANS"; http://www.adtechglobal.com/Data/Sites/1/marketing/Junipersolutionbriefensuringnonstopreliabilityforwlan.pdf.

* cited by examiner

*Primary Examiner* — Yair Leibovich
(74) *Attorney, Agent, or Firm* — Haynes and Boone, LLP (57) ABSTRACT

An access point IHS group controller failover system includes a first access point IHS group controller that controls a first access point IHS group that includes plurality of access point IHSs. Following a failure of the first access point IHS group controller, the first access point IHS broadcasts a first access point IHS identifier to a first subset of the plurality of access point IHSs. The first access point IHS then registers the first subset of the plurality of access point IHSs as members of a second access point IHS group, and controls at least some functions of the second access point IHS group. When the first access point IHS detects activity from the first access point IHS group controller, it instructs the first subset of the plurality of access point IHSs in the second access point IHS group to reconnect to the first access point IHS group controller.

18 Claims, 6 Drawing Sheets

ACCESS POINT CONTROLLER FAILOVER SYSTEM

BACKGROUND

The present disclosure relates generally to information handling systems (IHSs), and more particularly to a failover system for access point IHS controllers.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some IHSs include network connectivity and control functionality that allows those IHSs to communicate with other IHSs in order to coordinate into controller groups such that one of the IHSs in the controller group may control at least some functions of the other IHSs in that controller group. For example, wireless access point IHSs allow client devices to connect to a wired network using wireless communication technologies (e.g., WiFi wireless communication technologies), and some wireless access point IHSs may be configured to communicate with each other to form an access point IHS group that provides a client device the ability to access the wired network over a larger physical area than any single access point IHS may provide while only having to provide a single set of access credentials. In such access point IHS groups, an access point IHS group controller may either be provided (e.g., as a dedicated access point IHS group controller) to perform control functionality for the group. The failure of such access point IHS group controllers raises a number of issues.

For example, in conventional access point IHS group systems, when the access point IHS group controller fails, the access point IHSs in that access point IHS group will communicate with other access point IHSs in the access point IHS group to attempt to locate another access point IHS group controller. If no access point IHS group controller can be located following the failure of an access point IHS group controller of an access point IHS group, controller functionality is lost, which can result in an inability to authenticate client devices, allocate Internet Protocol Addresses, manage client devices, and/or provide client devices access to the network.

Accordingly, it would be desirable to provide an access point IHS group controller failover system.

SUMMARY

According to one embodiment, an information handling system (IHS) includes a chassis; a network interface that is located in the chassis and that is configured to couple to a network; a processing system that is located in the chassis and that is coupled to the network interface; and a memory system that is located in the chassis, coupled to the processing system, and that includes instructions that, when executed by the processing system, cause the processing system to provide a first access point IHS that is configured, following a failure of a first access point IHS group controller of a first access point IHS group, to: broadcast a first identifier for the first access point IHS to a first subset of the plurality of access point IHSs; register the first subset of the plurality of access point IHSs as members of a second access point IHS group; control at least some function of the second access point IHS group; detect activity from the first access point IHS group controller; and instruct the first subset of the plurality of access point IHSs in the second access point IHS group to reconnect to the first access point IHS group controller.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
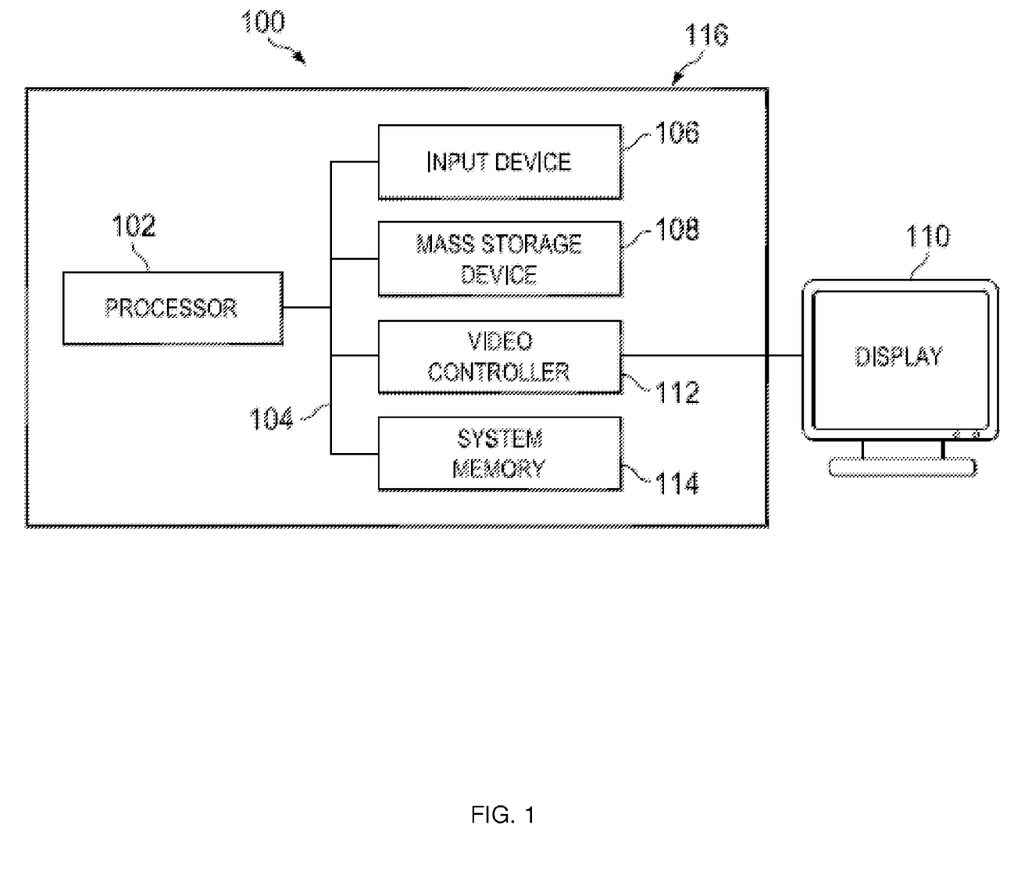
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
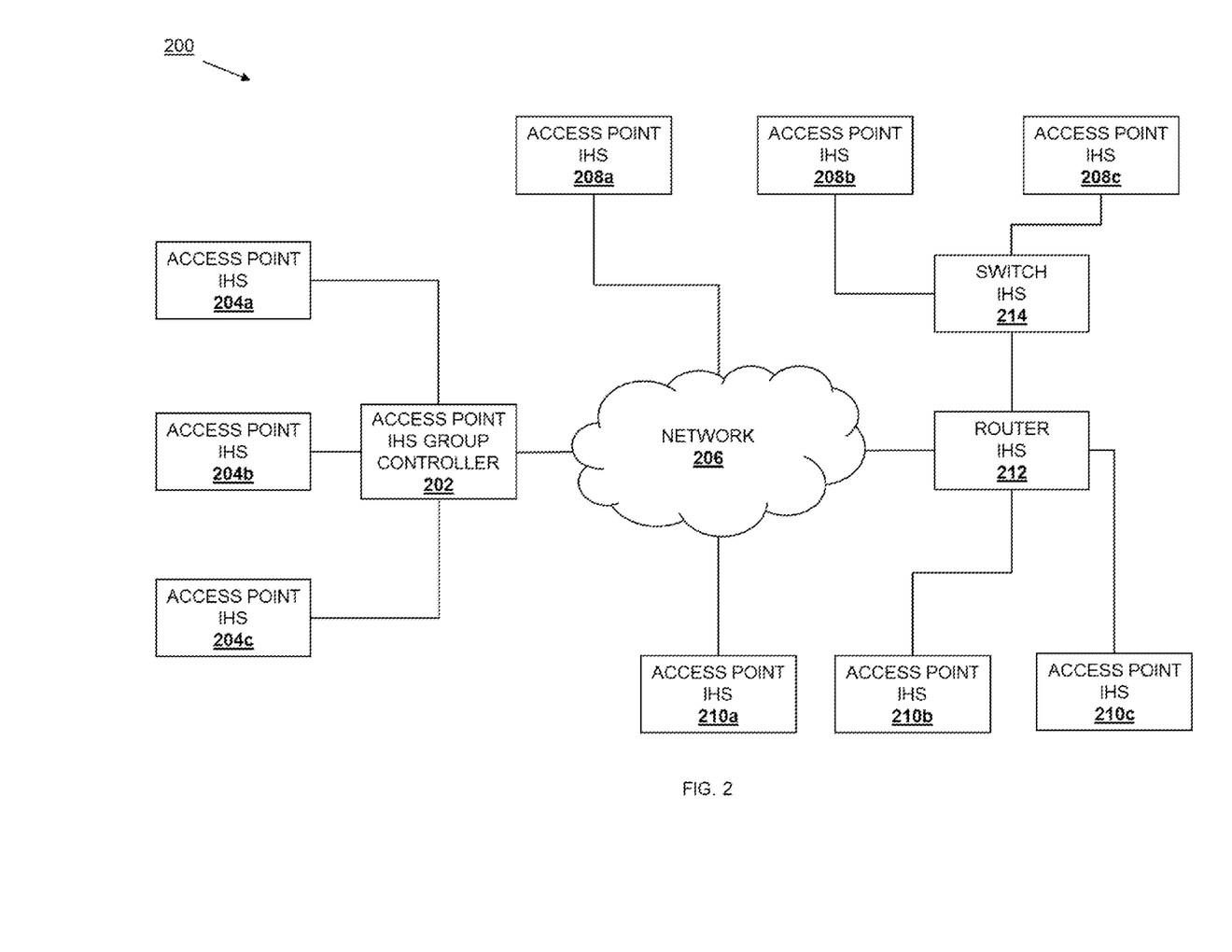
FIG. 2 is a schematic view illustrating an embodiment of an access point IHS group controller failover system.

Referring now to FIG. 2, an embodiment of a virtual controller failover system is illustrated that in the specific example provided below is an access point IHS group controller failover system 200. The access point IHS group controller failover system 200 includes an first access point IHS group controller 202 that may be the IHS 100 discussed above with reference to FIG. 1 and/or that may include some or all of the components of the IHS 100. As such, the first access point IHS group controller 202 may include a processing system (e.g., the processor 102), a memory system (e.g., the system memory 114) that includes instructions that when executed by the processing system cause the processing system to perform the functions of the first access point IHS group controller 202 discussed below, and a first access point IHS group controller database (e.g., the mass storage device 108 or the system memory 114) that may store the virtual controller group information discussed below. In different examples, the first access point IHS group controller 202 may be a dedicated virtual controller IHS that is configured to control virtual controller groups, or may be an access point IHS that includes virtual controller functionality that allows that access point IHS to control virtual controller groups. While a single access point IHS group controller is illustrated in the access point IHS group controller failover system 200, additional access point IHS group controllers may be included in the access point IHS group controller failover system 200 while remaining within the scope of the present disclosure.

The first access point IHS group controller 202 is directly coupled to a plurality of access point IHSs 204a, 204b, and 204c (e.g., via a direct connection between network interfaces on the access point IHSs 204a-c and the first access point IHS group controller 202), and coupled to a network 206 (e.g., a Local Area Network (LAN), the Internet, etc.) that is coupled to a plurality of access point IHSs 208a, 208b, 208c, 210a, 210b, and 210c. In an embodiment, any or all of the plurality of access point IHS 204a-c, 208a-c, and 210a-c may be the IHS 100 discussed above with reference to FIG. 1, and/or may include some or all of the components of the IHS 100. In the illustrated embodiment, the access point IHSs 208a and 210a are coupled directly to the network 206, the access point IHSs 210b and 210c are coupled to the network 206 through a router IHS 212 (which may be the IHS 100 discussed above with reference to FIG. 1 and/or which may include some or all of the components of the IHS 100), and the access point IHSs 208b and 208c are coupled to the network 206 through a switch IHS 214 (which may be the IHS 100 discussed above with reference to FIG. 1 and/or which may include some or all of the components of the IHS 100) that is coupled to the router IHS 212. While only nine access point IHSs are illustrated in the access point IHS group controller failover system 200, one of skill in the art in possession of the present disclosure will recognize that any number of access point IHSs may be included in the access point IHS group controller failover system 200 while remaining within the scope of the present disclosure.

Figure 3:
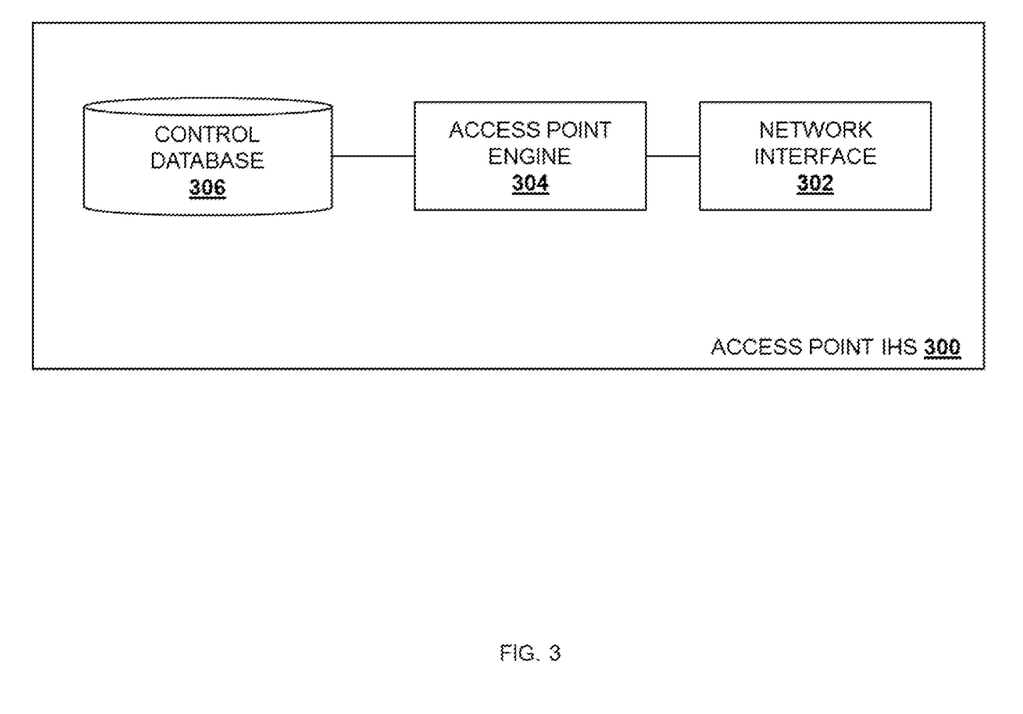
FIG. 3 is a schematic view illustrating an embodiment of an access point IHS.

Referring now to FIG. 3, an embodiment of an access point IHS 300 is illustrated that may be, for example, any of the access point IHSs 204a-c, 208a-c, and 210a-c discussed above. The access point IHS 300 includes a network interface 302 (e.g., a Network Interface Controller (NIC)) that is configured to couple to a network. The access point IHS 300 also includes a processing system (not illustrated, but which may be the processor 102 discussed above with reference to FIG. 1) and a memory system (not illustrated, but which may be the system memory 114 discussed above with reference to FIG. 1) that includes instructions that, when executed by the processing system, cause the processing system to provide an access point engine 304 that operates to perform the functions of the access point engines and access point IHSs discussed below. The access point engine 304 is coupled (e.g., via a coupling to the processing system) to a control database 306 that may be provided using a non-transitory memory or storage device. In the examples below, the access point engine 304 is discussed primarily as performing failover functions, but one of skill in the art will recognize that the access point IHS 300 may include a plurality of IHS components that operate to provide the access point engine 304 and/or other engines to perform access point functions as well as control functions for virtual controller group IHSs in a virtual controller group. In the examples provided below, those virtual controller group IHSs are illustrated and described as access point IHSs that allow wireless devices to connect to a wired network using wireless communication technologies (e.g., WiFi wireless communication technologies). However, the systems and methods described herein will be beneficial for any network-connected devices that include group controller functionality such as, for example, Software Defined Network (SDN) controllers and/or a variety of other group controller systems known in the art, and thus the application of the systems and methods taught herein to such devices and systems will fall within the scope of the present disclosure.

Figure 4:
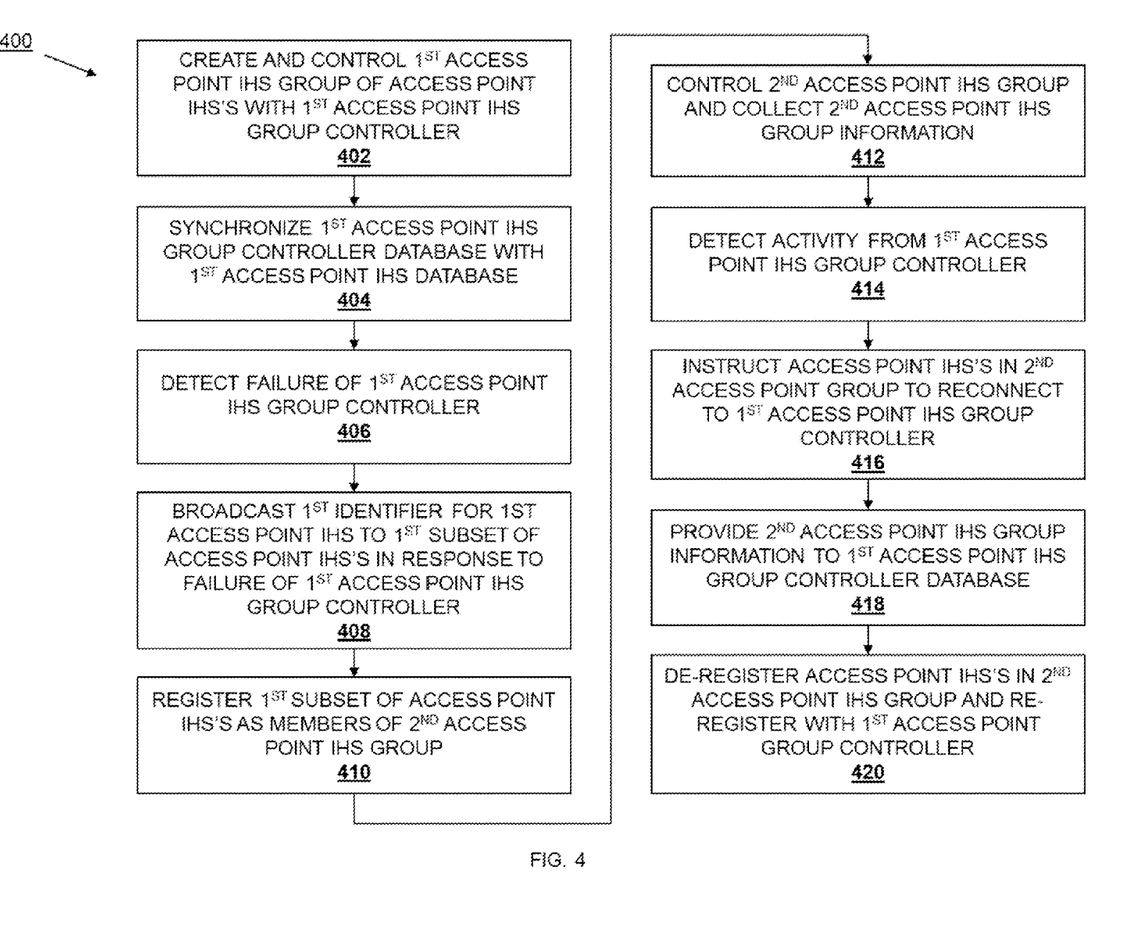
FIG. 4 is a flow chart illustrating an embodiment of an access point IHS group controller failover method.

Referring now to FIG. 4, an embodiment of an access point IHS group controller failover method 400 is illustrated. As discussed in further detail below, the systems and methods of the present disclosure provide access point IHS groups with access point IHSs that include at least some access point IHS group controller functionality and that are configured, following the failure of an access point IHS group controller that controls the access point IHS group, to broadcast an identifier to a subset of the access point IHSs in their access point IHS group, register that subset of access point IHSs as members of a second access point IHS group, and control that second access point IHS group until activity is detected in the first access point IHS group controller, at which time an instruction is sent to the access point IHSs in the second access point IHS group to reconnect to the first access point IHS group controller. As discussed above, when the access point IHS group controller in a conventional access point IHS group system fails, the access point IHSs in that access point IHS group will attempt to locate a new access point IHS group controller and, if unsuccessful, controller functionality is lost, which can result in an inability to authenticate client devices, allocate Internet Protocol Addresses, manage client devices, and/or provide client devices access to the network. The systems and methods of the present disclosure provide for at least some (and in some embodiments, full) controller functionality following the failure of an access point IHS group controller that controls an access point IHS group by enabling access point IHSs in that access point IHS group to create new access point IHS groups made up of subsets of the access point IHSs and temporarily control those access point IHSs until the failed access point IHS group controller recovers from the failure.

Figure 5A:
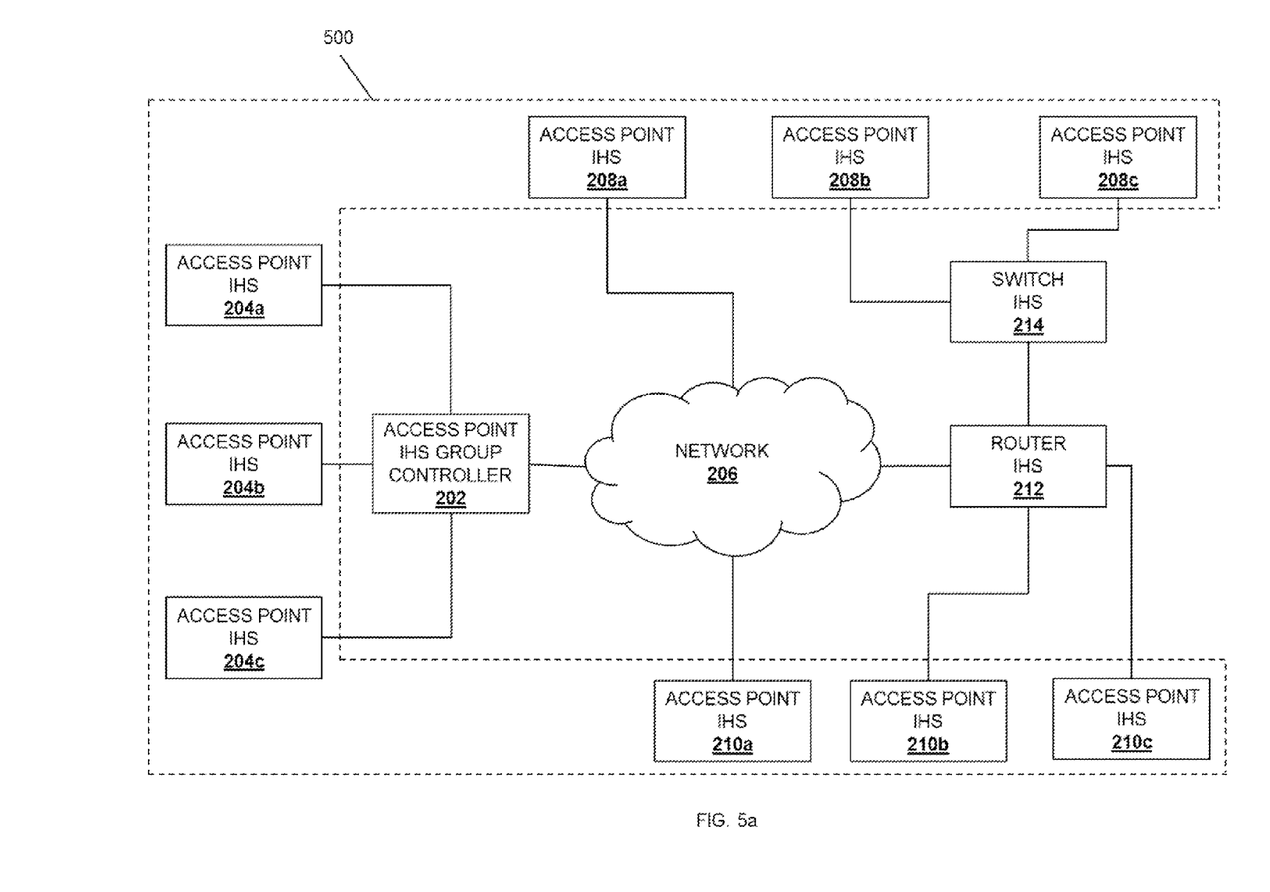
FIG. 5a is a schematic view illustrating an embodiment of an access point IHS group controller failover system including a single access point IHS group including a plurality of access point IHSs

Referring now to FIGS. 4 and 5a, the method 400 begins at block 402 where a first access point IHS group including a plurality of access point IHSs is created and controlled with a first access point IHS group controller. In an embodiment, the first access point IHS group controller 202 may exchange communications with the access point IHSs 204a-c, 208a-c, and 210a-c (e.g., upon the access point IHSs booting) that allow the access point IHSs 204a-c, 208a-c, and 210a-c to register, configure, and/or perform any other functions known in the art to create a first access point IHS group 500 (illustrated by the dotted line in FIG. 5a) that is controlled by the first access point IHS group controller 202. Following the creation of the first access point IHS group 500, the access point IHSs 204a-c, 208a-c, and 210a-c may act as gateways to the network 206 while the first access point IHS group controller 202 controls the first access point IHS group 500 by authenticating client devices that connect to the access point IHSs 204a-c, 208a-c, and 210a-c, allocating Internet Protocol (IP) addresses to the access point IHSs 204a-c, 208a-c, and 210a-c and/or their connected client devices, managing client devices connected to the access point IHSs 204a-c, 208a-c, and 210a-c, providing network access to the network for client devices connected to the access point IHSs 204a-c, 208a-c, and 210a-c, and/or performing any other control functionality known in the art.

The method 400 then proceeds to block 404, where a first access point IHS group controller database is synchronized with a first access point IHS database. While the blocks of the method 400 are illustrated and described as being performed by a first access point IHS that is the access point IHS 208a, one of skill in the art will recognize that those blocks may be performed by any of the other access point IHSs in the access point IHS group controller failover system 200 (e.g., the access point IHS 204a and the access point IHS 210a in some examples discussed below) and may be performed simultaneously by multiple access point IHSs in the access point IHS group controller failover system 200 while remaining within the scope of the present disclosure. In an embodiment of block 404, the first access point IHS 208a communicates with the first access point IHS group controller 202 to synchronize virtual controller group information in the first access point IHS group controller database of the first access point IHS group controller 202 that is collected, generated, and/or otherwise stored during virtual controller operations, with the control database 306 in the first access point IHS 208a. As such, any information stored by the first access point IHS group controller 202 during the creation and control of the first access point IHS group 500 may be retrieved and stored in the control database 306 in the first access point IHS 208a (as well as in access point IHS databases in other access point IHSs, e.g., access point IHSs 204a and 210a). In some embodiments, the synchronization of the first access point IHS group controller database may only be performed by access point IHSs in the first access point IHS group 500 that have at least some virtual controller functionality, while in other embodiments, the synchronization of the first access point IHS group controller database may be performed by any or all access point IHSs in the first access point IHS group 500. Furthermore, block 404 may be performed between the access point IHS(s) and the first access point IHS group controller 202 periodically and/or continuously such that any information about the first access point IHS group 500 stored by the first access point IHS group controller 202 is synchronized with databases of the access point IHS(s).

The method 400 then proceeds to block 406 where a failure of the first access point IHS group controller is detected. In some embodiments of block 406, the first access point IHS 208a detects the failure of the first access point IHS group controller 202. In other embodiments, access point IHS(s) in first access point IHS group 500 other than the first access point IHS 208a detect the failure of the first access point IHS group controller 202. For example, the first access point IHS 208a and/or other access point IHSs in the first access point IHS group 500 may detect the failure of the first access point IHS group controller 202 at block 406 in response to not receiving a communication from the first access point IHS group controller 202 for a predetermined amount of time. In another example, the first access point IHS 208a and/or other access point IHSs in the first access point IHS group 500 may detect the failure (or the imminent failure) of the first access point IHS group controller 202 at block 406 in response to receiving an imminent failure message from the first access point IHS group controller 202, as described in co-owned and co-pending patent application Ser. No. 14/558,455, filed on Dec. 2, 2014, now U.S. Pat. No. 9,489,281, issued on Nov. 8, 2016. While a few examples of the detection of a failure or imminent failure of a virtual controller have been provided, one of skill in the art in possession of the present disclosure will recognize that any of a variety of failure detection methods may fall within the scope of the present disclosure.

The failure of the first access point IHS group controller 202 may be a result of a wide variety of failure scenarios known in the art. For example, the first access point IHS group controller 202 may fail or otherwise be unable to perform control functions for the access point IHS group 500 due to a degraded power supply, a power supply surge, degraded signal quality, degraded hardware resources, degraded software resources, thermal issues, a user defined shut-down, and/or a variety of other failure issues known in the art. In many cases, those failure scenarios may be temporary.

In different embodiments, the first access point IHS 208a and/or one of the other access point IHSs in the first access point IHS group 500 may perform different functions in response to detecting the failure (or imminent failure) of the first access point IHS group controller 202 at block 406 or otherwise determining that the first access point IHS group controller 202 has failed or is going to fail. For example, following the failure (or determining imminent failure) of the first access point IHS group controller 202, the first access point IHS 208a and/or one of the other access point IHSs in the first access point IHS group 500 may broadcast a nomination message to a subset of the plurality of access point IHSs 204*a-c*, 208*a-c*, and 210*a-c*. In some embodiments, an administrator or user may designate the access point IHSs that will be included in a subset to which nomination messages with be sent by any particular access point IHS, and may store that designation in the control database 306. In some embodiments, the subset of the plurality of access point IHSs 204*a-c*, 208*a-c*, and 210*a-c* to which the nomination message is broadcast may include access point IHSs that are in the same collision domain as the access point IHS that is broadcasting the nomination message. For example, the access point IHSs 208*a*, 208*b*, and 208*c* may be in the same collision domain, and the first access point IHS 208*a* may broadcast the nomination message to the access point IHSs 208*b* and 208*c*. Similarly, the access point IHSs 204*a*, 204*b*, and 204*c* may be in the same collision domain, and the access point IHS 204*a* may broadcast the nomination message to the access point IHSs 204*b* and 204*c*, while the access point IHSs 210*a*, 210*b*, and 210*c* may be in the same collision domain, and the access point IHS 210*a* may broadcast the nomination message to the access point IHSs 210*b* and 210*c*.

In an embodiment, the nomination message may include information retrieved from the control database 206 of the access point IHS that sent the nomination message. For example, the nomination message may inform access point IHSs in the subset that the first access point IHS group controller 202 has failed, may identify the access point IHSs in the subset, may include a nomination list that identifies the access point IHSs in the subset that include at least some virtual controller functionality, may request any access point IHSs in the subset that have at least some virtual controller functionality to identify themselves to the subset, and/or may include a variety of other information known in the art that would help the access point IHSs in the subset create a new access point IHS group. In some embodiments, an administrator or user may designate the access point IHSs that will be nominated to act as virtual controllers in the event of a failure of the access point IHS group controller, as well as rules to join an access point IHS group created by an access point IHS. In response to receiving the nomination message, the access point IHSs in the subset may communicate with each other to nominate one of the access point IHSs in the subset as a second access point IHS group controller. For example, the access point IHSs 208*a*, 208*b*, and 208*c* may nominate the first access point IHS 208*a* as a second access point IHS group controller, the access point IHSs 204*a*, 204*b*, and 204*c* may nominate the access point IHS 204*a* as a second access point group controller, and the access point IHSs 210*a*, 210*b*, and 210*c* may nominate the access point IHS 210*a* as a second access point IHS group controller.

The method 400 then proceeds to block 408 where a first identifier for a first access point IHS is broadcast to a first subset of the access point IHSs. In some embodiments, block 408 may be performed by the first access point IHS 208*a* in response to detecting the failure of the first access point IHS group controller, while in some embodiments, block 408 may be performed by the first access point IHS 208*a* in response to receiving the nomination message and/or the nomination as the second access point IHS group controller as discussed above. At block 408, the first access point IHS 208*a* may broadcast the first identifier for the first access point IHS 208*a* to a first subset of the plurality of access point IHSs 204*a-c*, 208*a-c*, and 210*a-c*. The first identifier may be part of a message that indicates to the first subset of access point IHSs 204*a-c*, 208*a-c*, and 210*a-c* that the first access point IHS 208*a* will act as a new access point IHS group controller for a new access point IHS group, and may include information describing the virtual controller capabilities of the first access point IHS 208*a*.

In some embodiments, the subset of the plurality of access point IHSs 204*a-c*, 208*a-c*, and 210*a-c* to which the first identifier is broadcast may include access point IHSs that are in the same collision domain as the first access point IHS 208*a*. For example, the access point IHSs 208*a*, 208*b*, and 208*c* may be in the same collision domain, and the first access point IHS 208*a* may broadcast the first identifier to the access point IHSs 208*b* and 208*c*. Similarly, the access point IHSs 204*a*, 204*b*, and 204*c* may be in the same collision domain, and the access point IHS 204*a* may broadcast its identifier to the access point IHSs 204*b* and 204*c*, while the access point IHSs 210*a*, 210*b*, and 210*c* may be in the same collision domain, and the access point IHS 210*a* may broadcast its identifier to the access point IHSs 210*b* and 210*c*. In an embodiment, identifiers for the access point IHSs may include an Internet Protocol (IP) address for the access point IHS, a Media Access Control (MAC) address for the access point IHS, and/or a variety of other IHS identifiers known in the art.

Figure 5B:
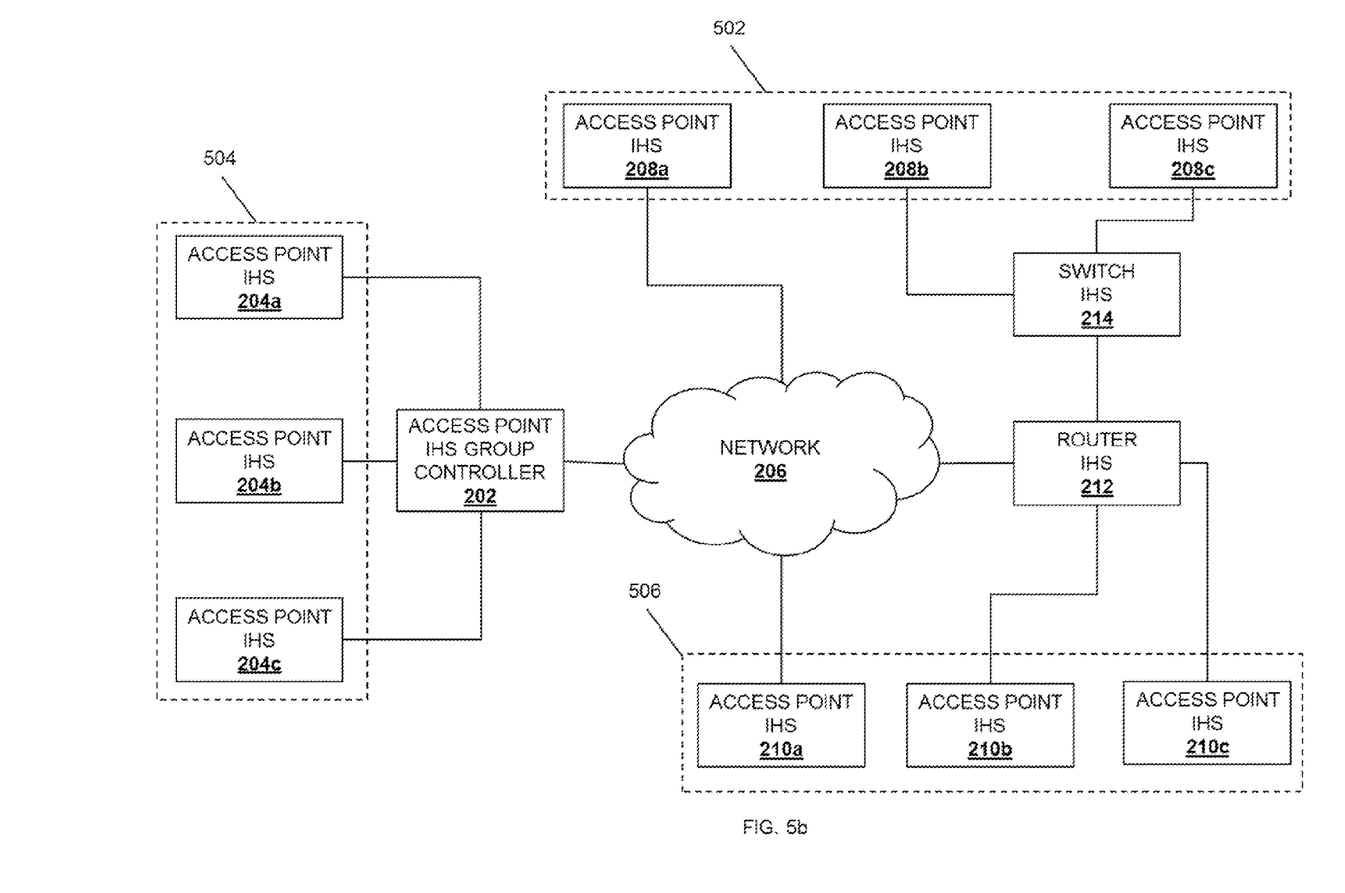
FIG. 5b is a schematic view illustrating an embodiment of an access point IHS group controller failover system including a plurality of different access point IHS groups made up of different subsets of the plurality of access point IHSs of FIG. 2.

Referring now to FIGS. 4 and 5*b*, the method 400 then proceeds to block 410 where the first subset of access point IHSs are registered as members of a second access point IHS group. In an embodiment, in response to receiving the first identifier for the first access point IHS 208*a*, the access point IHSs 208*b* and 208*c* in the first subset may communicate with the first access point IHS 208*a* to register as members of a second access point IHS group 502 controlled by the first access point IHS 208*a*, and the first access point IHS 208*a* may register the access point IHSs 208*b* and 208*c* in the first subset as members of the second access point IHS group 502. Similarly, the access point IHSs 204*b* and 204*c* may register with the access point IHS 204*a* for a third access point IHS group 504, and the access point IHSs 210*b* and 210*c* may register with the access point IHS 210*a* for a fourth access point IHS group 506.

The method 400 then proceeds to block 412 where the second access point IHS group is controlled and second access point IHS group information is collected. In an embodiment of block 412, the first access point IHS 208*a* may operate to perform any control functionality that it is capable of in order to control the second access point IHS group 502, including authenticating client devices that connect to the access point IHSs 208*b* and 208*c*, allocating Internet Protocol (IP) addresses to the access point IHSs 208*b* and 208*c* and/or their connected client devices, managing client devices connected to the access point IHSs 208*b* and 208*c*, providing network access to the network for client devices connected to the access point IHSs 208*b* and 208*c*, and/or performing any other control functionality known in the art. Similarly, the access point IHS 204*a* may operate to perform any control functionality that is it is capable of in order to control the access point IHSs 204*b* and 204*c* in the third access point IHS group 504, and the access point IHS 210*a* may operate to perform any control functionality that it is capable of in order to control the access point IHSs 210*b* and 210*c* in the fourth access point IHS group 504.

In the course of controlling the second access point IHS group 502 at block 412, the first access point IHS 208*a* may generate, retrieve, collect, and/or otherwise compile second access point IHS group information associated with the creation and control of the second access point IHS group 502 that is stored in the control database 306. The second access point IHS group information may include available computing resources (e.g., processor speed, number of processor cores, flash memory size, storage space, memory space, etc.) on an access point IHS. In an embodiment, the first access point IHS group controller may need to know if any of the access point IHSs in the second access point IHS group can be managed by an access point IHS selected to be the second access point IHS group virtual controller, and if an access point IHS does not have the appropriate computing resources then that access point IHS would not be able to function as a virtual controller for the second access point IHS group.

The second access point IHS group information may also include radio frequencies used by the access point IHSs, radio management algorithms and techniques used to manage the radio properties of the access point IHSs, and/or radio modulation (e.g., QSPK, QAM, OFDM, etc.) supported by the access point IHSs. In an embodiment, the first access point IHS group controller may need to know if there is a commonality of radio settings and capabilities between access point IHSs in the second access point IHS group. For example, common radio settings and capabilities may allow more efficient use of computing resources. The second access point IHS group information may also include active Power Over Ethernet (PoE) included on the access point IHSs. In an embodiment, the first access point IHS group controller may need to know if there are PoE requirements for access point IHSs. For example, if the PoE power source is lost for the first access point IHS group controller, then associated access point IHSs may no longer function due to the loss of power supply via PoE from the IHS group controller. While a few examples have been provided, the second access point IHS group information may include any other information utilized in creating and controlling the second access point IHS group 502 while remaining within the scope of the present disclosure.

Similarly, the access point IHS 208a may generate, retrieve, collect, and/or otherwise compile third access point IHS group information associated with the creation and control of the third access point IHS group 504 that is stored in its control database 306, and the access point IHS 210a may generate, retrieve, collect, and/or otherwise compile fourth access point IHS group information associated with the creation and control of the fourth access point IHS group 506 that is stored in its control database 306.

The method 400 then proceeds to block 414 where activity is detected from the first access point IHS group controller. In an embodiment, while controlling the second access point IHS group, the first access point IHS 208a operates to attempt communication with, listen for communication from, and/or otherwise monitor the first access point IHS group controller 202 to determine whether the first access point IHS group controller 202 is performing any activity that indicates that the first access point IHS group controller 202 is able to resume control of the first access point IHS group 500. For example, activities by the first access point IHS group controller 202 that indicate the ability to perform control functions for the first access point IHS group 500 may include the access point IHS group controller or virtual controller completing synchronization with the second access point IHS group controller; the access point IHS group controller or virtual controller restoring its physical links, the access point IHS group controller or virtual controller successfully starting operation; the access point IHS group controller or virtual controller discovering access point IHS, the access point IHS group controller or virtual controller assuming control of access point IHSs, and/or a variety of other virtual controller activities known in the art. Thus, following a failure, the first access point IHS group controller 202 may recover from that failure (e.g., by having a degraded power supply recover to supply sufficient power, having a degraded port recover to provide sufficient signal quality, having a degraded hardware resource recover, having a degraded software resource recover, recover from a thermal issue, restart after a user defined shut-down, etc.) and perform some activity that may be detected by the first access point IHS 208a. Similarly, the access point IHS 208a and the access point IHS 210a may monitor for and detect the same activity from the first access point IHS group controller 202.

The method 400 then proceeds to block 416 where the access point IHSs in the second access point IHS group are instructed to reconnect to the first access point IHS group controller. In an embodiment, the first access point IHS 208a sends an instruction to the access point IHSs 208b and 208c in the second access point IHS group 502 to reconnect to the first access point IHS group controller 202. The instruction to reconnect to the first access point IHS group controller 202 may include any information needed by the access point IHSs 208b and 208c to communicate with, register, and/or otherwise interact with the first access point IHS group controller 202 to rejoin the first access point IHS group 500. Similarly, the access point IHS 204a may send an instruction to the access point IHSs 204b and 204c in the third access point IHS group 504 to reconnect to the first access point IHS group controller 202, and the access point IHS 210a may send an instruction to the access point IHSs 210b and 210c in the fourth access point IHS group 506 to reconnect to the first access point IHS group controller 202. In response to receiving the instruction to reconnect to the first access point IHS group controller 202, the access point IHSs may communicate with, register, and/or otherwise interact with the first access point IHS group controller 202 to rejoin the first access point IHS group 500.

The method 400 then proceeds to block 418 where second access point group information is provided to the first access point IHS group controller database. As discussed above, during the control of the second access point IHS group 502, the first access point IHS 208a may generate, retrieve, collect, and/or otherwise compile second access point IHS group information associated with the creation and control of the second access point IHS group 502 that is stored in the control database 306. At block 418, the first access point IHS 208a may provide that second access point IHS group information over the network 206 to the first access point IHS group controller 202 such that the first access point IHS group controller 202 stores that second access point IHS group information in its first access point IHS group controller database. Similarly, the access point IHS 204a may provide third access point IHS group information that was compiled during the creation and control of the third access point IHS group 504 to the first access point IHS group controller 202 such that the first access point IHS group controller 202 stores that third access point IHS group information in its first access point IHS group controller database, and the access point IHS 210a may provide fourth access point IHS group information that was compiled during the creation and control of the fourth access point IHS group 506 to the first access point IHS group controller 202 such that the first access point IHS group controller 202 stores that fourth access point IHS group information in its first access point IHS group controller database. Thus, following block 418, the first access point IHS group controller 202 may have received and/or stored all virtual controller group information associated with the operation of virtual controller groups subsequent to the failure of the first access point IHS group controller 202.

The method 400 then proceeds to block 420 where the access point IHSs in the second access point IHS group are de-registered, and the first access point IHS re-registers with the first access point IHS group controller. In an embodiment of block 420, the first access point IHS 208*a* and/or the access point IHSs 208*b* and 208*c* operate to de-register the access point IHSs 208*b* and 208*c* from the second access point IHS group 502. The access point IHSs 208*b* and 208*c* may then communicate with the first access point IHS group controller 202 to re-register as a members of the first access point IHS group 500 that is controlled by the first access point IHS group controller 202, and the first access point IHS 208*a* may revert from virtual controller functionality back to access point functionality and communicate with the first access point IHS group controller 202 to re-register as a member of the first access point IHS group 500. Similarly, the access point IHS 204*a* and/or the access point IHSs 204*b* and 204*c* operate to de-register the access point IHSs 204*b* and 204*c* from the third access point IHS group 504, and the access point IHSs 204*a*, 204*b* and 204*c* may then communicate with the first access point IHS group controller 202 to re-register as a members of the first access point IHS group 500 that is controlled by the first access point IHS group controller 202, while the access point IHS 210*a* and/or the access point IHSs 210*b* and 210*c* operate to de-register the access point IHSs 210*b* and 210*c* from the fourth access point IHS group 506, and the access point IHSs 210*a*, 210*b* and 210*c* may then communicate with the first access point IHS group controller 202 to re-register as a members of the first access point IHS group 500 that is controlled by the first access point IHS group controller 202. Following block 420, the first access point IHS group controller 202 may operate to control the first access point IHS group 500 substantially as described above with regard to block 402 of the method 400.

Thus, systems and methods have been described that provide virtual controllers for subsets of IHSs in a virtual controller group that has had its virtual controller fail. Following the failure of a virtual controller of a virtual controller group (an "initial virtual controller group), at least one of the IHSs with virtual controller functionality in the initial virtual controller group will broadcast its identifier to a subset of the IHSs so that they may join a new virtual controller group controlled by that IHS. Such systems reduce the amount of time that controller functionality is lost for IHSs in a virtual controller group. Furthermore, upon recovery of the failed virtual controller, the IHS acting as the virtual controller for the new virtual controller group will instruct the IHSs in the new virtual controller group to reconnect to the recovered virtual controller, and will itself reconnect to the recovered virtual controller group so that the IHSs may again join the initial virtual controller group that is controlled by the recovered virtual controller. As such, IHSs may act as temporary virtual controllers when dedicated virtual controllers fail, and may then hand off control back to the dedicated virtual controllers when they recover from the failure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An access point information handling system (IHS) group controller failover system, comprising:
   a network;
   a first access point IHS group controller that is connected to the network and that controls a first access point IHS group; and
   a plurality of access point IHSs that are coupled to the network and that are members of the first access point IHS group, wherein a first access point IHS of the plurality of access point IHSs is configured to:
      synchronize a first access point IHS database with a first access point IHS group controller database prior to a failure of the first access point IHS group controller;
      broadcast a first identifier for the first access point IHS to a first subset of the plurality of access point IHSs following the failure of the first access point IHS group controller;
      register the first subset of the plurality of access point IHSs as members of a second access point IHS group;
      control at least some functions of the second access point IHS group;
      collect second access point IHS group information during the control of the at least some functions of the second access point IHS group and store the second access point IHS group information in the first access point IHS database;
      detect activity from the first access point IHS group controller;
      instruct the first subset of the plurality of access point IHSs in the second access point IHS group to reconnect to the first access point IHS group controller; and
      provide the second access point IHS group information from the first access point IHS database to the first access point IHS group controller database subsequent to detecting the activity from the first access point IHS group controller.

2. The access point IHS group controller failover system of claim 1, wherein at least one of the plurality of access point IHSs is configured to:
   detect the failure of the first access point IHS group controller; and
   broadcast a nomination message to the first subset of the plurality of access point IHSs.

3. The access point IHS group controller failover system of claim 2, wherein the access point IHSs in the first subset of the plurality of access point IHSs are configured, in response to receiving the nomination message, to:
   nominate the first access point IHS as a second access point IHS group controller of the second access point IHS group, wherein the first access point IHS broadcasts the first identifier in response to being nominated.

4. The access point IHS group controller failover system of claim 3, wherein the first access point IHS is configured to:
   deregister the first subset of the plurality of access point IHSs as members of a second access point IHS group subsequent to detecting the activity from the first access point IHS group controller; and
   re-register with the first access point IHS group controller as a member of the first access point IHS group.

5. The access point IHS group controller failover system of claim 1, wherein the first subset of the plurality of access point IHSs includes access point IHSs that are in the same collision domain.

6. An access point information handling system (IHS) group controller failover system, comprising:
  a network;
  a first access point IHS group controller, comprising a first access point IHS group controller database, that is connected to the network and that controls a first access point IHS group;
  a plurality of access point IHSs, each comprising an access point IHS database, that are coupled to the network and that are members of the first access point IHS group, wherein a first access point IHS of the plurality of access point IHSs is configured, following a failure of the first access point IHS group controller, to:
    broadcast a first identifier for the first access point IHS to a first subset of the plurality of access point IHSs;
    register the first subset of the plurality of access point IHSs as members of a second access point IHS group;
    control at least some functions of the second access point IHS group;
    detect activity from the first access point IHS group controller;
    instruct the first subset of the plurality of access point IHSs in the second access point IHS group to reconnect to the first access point IHS group controller; and
  wherein a second access point IHS of the plurality of access point IHSs is configured, following the failure of the first access point IHS group controller, to:
    broadcast a second identifier for the second access point IHS to a second subset of the plurality of access point IHSs that is different than the first subset;
    register the second subset of the plurality of access point IHSs as members of a third access point IHS group;
    control at least some functions of the third access point IHS group;
    detect activity from the first access point IHS group controller; and
    instruct the second subset of the plurality of access point IHSs in the third access point IHS group to reconnect to the first access point IHS group controller.

7. A first access point information handling system (IHS), comprising:
  a chassis;
  a network interface that is located in the chassis and that is configured to couple to a network;
  a processing system that is located in the chassis and that is coupled to the network interface; and
  a memory system that is located in the chassis, coupled to the processing system, and that includes instructions that, when executed by the processing system, cause the processing system to provide a first access point engine that is configured to:
    synchronize a first access point IHS database with a first access point IHS group controller database prior to a failure of a first access point IHS group controller that controls a first access point IHS group in which a plurality of access point IHSs that include the first access point IHS are members;
    broadcast, following the failure of the first access point IHS group controller, a first identifier for the first access point IHS to a first subset of the plurality of access point IHSs;
    register the first subset of the plurality of access point IHSs as members of a second access point IHS group;
    control at least some functions of the second access point IHS group;
    collect second access point IHS group information during the control of the at least some functions of the second access point IHS group and store the second access point IHS group information in the first access point IHS database;
    detect activity from the first access point IHS group controller;
    instruct the first subset of the plurality of access point IHSs in the second access point IHS group to reconnect to the first access point IHS group controller; and
    provide the second access point IHS group information from the first access point IHS database to the first access point IHS group controller database subsequent to detecting the activity from the first access point IHS group controller.

8. The first access point IHS of claim 7, wherein the first access point engine is configured to:
  detect the failure of the first access point IHS group controller; and
  broadcast a nomination message to the first subset of the plurality of access point IHSs.

9. The first access point IHS of claim 8, wherein the first access point engine is configured to:
  receive and store a nomination list that includes access point IHSs to be nominated in the event of the failure of the first access point IHS group controller; and
  create the nomination message using the nomination list.

10. The first access point IHS of claim 7, wherein the first access point engine is configured to:
  receive a nomination to be a second access point IHS group controller of the second access point IHS group, wherein the first access point IHS broadcasts the first identifier in response to receiving the nomination.

11. The first access point IHS of claim 7, wherein the first access point engine is configured to:
  deregister the first subset of the plurality of access point IHSs as members of a second access point IHS group subsequent to detecting the activity from the first access point IHS group controller; and
  re-register with the first access point IHS group controller as a member of the first access point IHS group.

12. The first access point IHS of claim 7, wherein the first subset of the plurality of access point IHSs includes access point IHSs that are in the same collision domain.

13. An access point information handling system (IHS) group controller failover method, comprising:
  synchronizing, by a first access point IHS that is a member of a first access point IHS group, a first access point IHS database with a first access point IHS group controller database prior to a failure of a first access point IHS group controller that controls the first access point IHS group in which a plurality of access point IHSs are members;
  broadcasting, by the first access point IHS following the failure of the first access point IHS group controller, a first identifier for the first access point IHS to a first subset of a plurality of access point IHSs;

registering, by the first access point IHS, the first subset of the plurality of access point IHSs as members of a second access point IHS group;

controlling, by the first access point IHS, at least some functions of the second access point IHS group;

collecting, by the first access point IHS, second access point IHS group information during the controlling of the at least some functions of the second access point IHS group and storing the second access point IHS group information in the first access point IHS database;

detecting, by the first access point IHS, activity from the first access point IHS group controller; and instructing, by the first access point IHS, the second access point IHS group to reconnect to the first access point IHS group controller; and providing, by the first access point IHS, the second access point IHS group information from the first access point IHS database to the first access point IHS group controller database subsequent to detecting the activity from the first access point IHS group controller.

14. The access point IHS group controller failover method of claim 13, further comprising:

detecting, by at least one of the plurality of access point IHSs, the failure of the first access point IHS group controller; and broadcasting, by the at least one of the plurality of access point IHSs, a nomination message to the first subset of the plurality of access point IHSs.

15. The access point IHS group controller failover method of claim 14, further comprising:

receiving, by the first access point IHS, a nomination of a second access point IHS group controller of the second access point IHS group, wherein the first access point IHS broadcasts the first identifier in response to receiving the nomination.

16. The access point IHS group controller failover method of claim 15, further comprising:

deregistering, by the first access point IHS, the first subset of the plurality of access point IHSs as members of a second access point IHS group; and re-registering, by the first access point IHS, as a member of the first access point IHS group.

17. The access point IHS group controller failover method of claim 13, wherein the first subset of the plurality of access point IHSs includes access point IHSs that are in the same collision domain.

18. An access point information handling system (IHS) group controller failover method, comprising:

broadcasting, by a first access point IHS that is a member of a first access point IHS group and following a failure of a first access point IHS group controller that controls the first access point IHS group in which a plurality of access point IHSs are members, a first identifier for the first access point IHS to a first subset of a plurality of access point IHSs, wherein the first access point IHS group controller is connected to a network and comprising a first access point IHS group controller database, and wherein each one of the access point IHSs comprising an access point IHS database;

registering, by the first access point IHS, the first subset of the plurality of access point IHSs as members of a second access point IHS group;

controlling, by the first access point IHS, the second access point IHS group;

detecting, by the first access point IHS, activity from the first access point IHS group controller;

instructing, by the first access point IHS, the second access point IHS group to reconnect to the first access point IHS group controller; and broadcasting, by a second access point IHS that is a member of the first access point IHS group and following the failure of the first access point IHS group controller that controls the first access point IHS group, a second identifier for the second access point IHS to a second subset of the plurality of access point IHSs that is different than the first subset;

registering, by the second access point IHS, the second subset of the plurality of access point IHSs as members of a third access point IHS group;

controlling, by the second access point IHS, the third access point IHS group;

detecting, by the second access point IHS, activity from the first access point IHS group controller; and instructing, by the second access point IHS, the third access point IHS group to reconnect to the first access point IHS group controller.

* * * * *